United States Patent
Yang

(10) Patent No.: US 8,149,130 B2
(45) Date of Patent: Apr. 3, 2012

(54) PORTABLE ELECTRONIC DEVICE OPERATEABLE BY ROTATION THEREOF

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 340 days.

(21) Appl. No.: 12/566,690

(22) Filed: Sep. 25, 2009

(65) Prior Publication Data
US 2011/0050443 A1 Mar. 3, 2011

(30) Foreign Application Priority Data
Sep. 3, 2009 (CN) .......................... 2009 1 0306536

(51) Int. Cl.
G08B 21/00 (2006.01)
(52) U.S. Cl. .................................. 340/686.3; 340/686.1
(58) Field of Classification Search ............... 340/407.1, 340/545.4, 545.5, 566, 571, 686.1, 686.3; 455/567, 569.1, 573; 368/10, 73; 396/427
See application file for complete search history.

(56) References Cited

U.S. PATENT DOCUMENTS

| | | | |
|---|---|---|---|
| 6,597,928 B2 * | 7/2003 | Ito | 455/567 |
| 2007/0159032 A1 * | 7/2007 | Louie | 312/221 |
| 2007/0200724 A1 * | 8/2007 | Lazo et al. | 340/693.1 |
| 2009/0280910 A1 * | 11/2009 | Gagner et al. | 463/42 |
| 2010/0124948 A1 * | 5/2010 | Johnston et al. | 455/569.1 |

* cited by examiner

Primary Examiner — Van T. Trieu
(74) Attorney, Agent, or Firm — Altis Law Group, Inc.

(57) ABSTRACT

A portable electronic device includes a housing, a rotation sensor, and a processor. The rotation sensor includes a supporting plate fixed to the housing, a cylindric carrier, an electron emitting device, a magnet, a number of strip-shaped electrodes, and a detecting device. The cylindric carrier is disposed on the supporting plate and is rotatable relative to the supporting plate. The electron emitting device is disposed on the supporting plate and emits electrons along the center axis of the cylindric carrier. The magnet provides a magnetic field substantially parallel to the supporting plate. The detecting device detects the falling position of the electrons and generates a signal representing the parameters of the rotation of the portable electronic device. The processor receives the signal generated by the detecting device and generates an operating signal for operating the portable electronic device.

16 Claims, 5 Drawing Sheets

PORTABLE ELECTRONIC DEVICE OPERATEABLE BY ROTATION THEREOF

BACKGROUND

1. Technical Field

The present disclosure relates to portable electronic devices and, particularly, to a portable electronic device capable of being operated by rotation thereof.

2. Description of Related Art

At present, ever smaller and more portable electronic devices, such as digital cameras and mobile phones, are in demand, while at the same time larger screens are desired for displaying menus or pictures on the very same electronic devices. For a typical electronic device, many buttons, which compete for space with the display screen are used for operating the electronic device.

What is needed, therefore, is a portable electronic device which can be operated with fewer buttons, to allow more space for a display, and still fulfill the demand for greater miniaturization to overcome or at least mitigate the above-described problem.

BRIEF DESCRIPTION OF THE DRAWINGS

Many aspects of the present portable electronic device can be better understood with reference to the accompanying drawings. The components in the drawings are not necessarily drawn to scale, the emphasis instead being placed upon clearly illustrating the principle of the present portable electronic device. In the drawings, all the views are schematic.

DETAILED DESCRIPTION

Embodiments of the present disclosure will now be described in detail below, with reference to the accompanying drawings.

Figure 1:
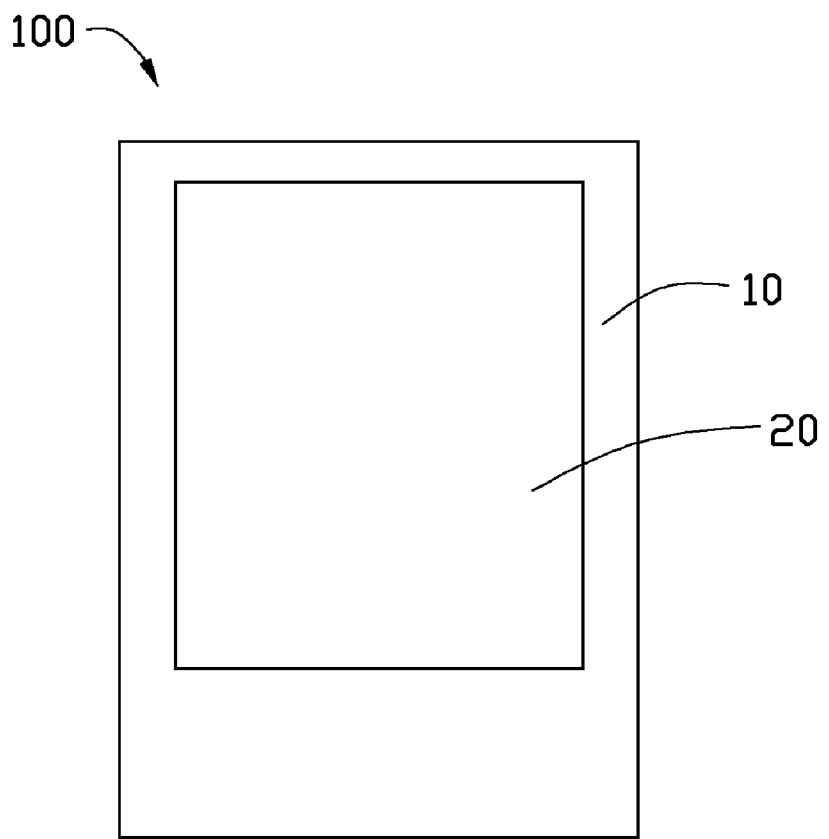
FIG. 1 is a schematic view of a portable electronic device according to an exemplary embodiment.
Figure 2:
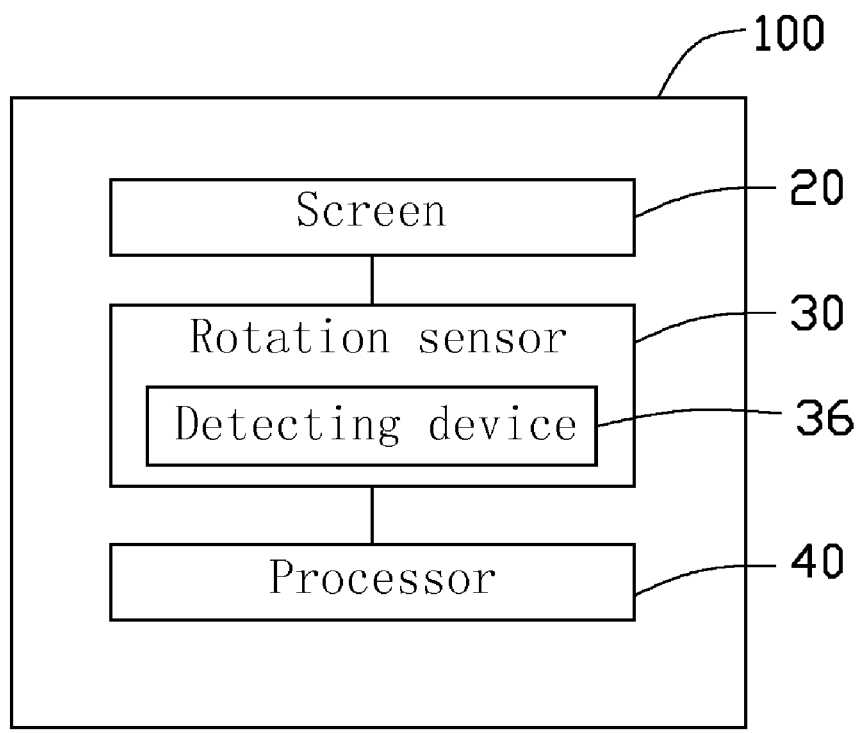
FIG. 2 is a schematic, functional block diagram of the portable electronic device of FIG. 1.

Referring to FIGS. 1 and 2, a portable electronic device 100 according to an exemplary embodiment, is shown. The portable electronic device 100 includes a housing 10, a screen 20, a rotation sensor 30, and a processor 40.

The portable electronic device 100 can be a digital camera, a video camera or a mobile phone, etc. The screen 20 is disposed on an outer surface of the housing 10 for displaying menus, pictures and so on.

Figure 3:
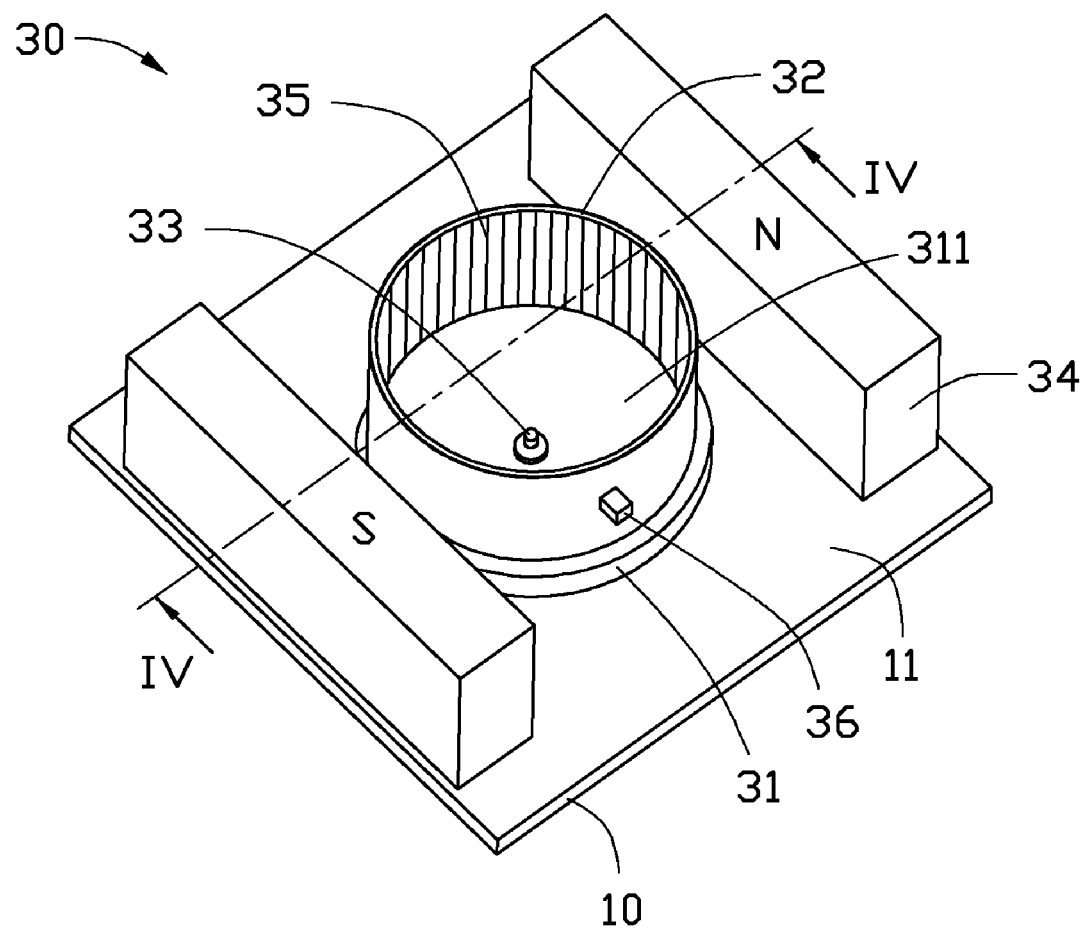
FIG. 3 is a schematic view of a rotation sensor of the portable electronic device of FIG. 1.
Figure 4:
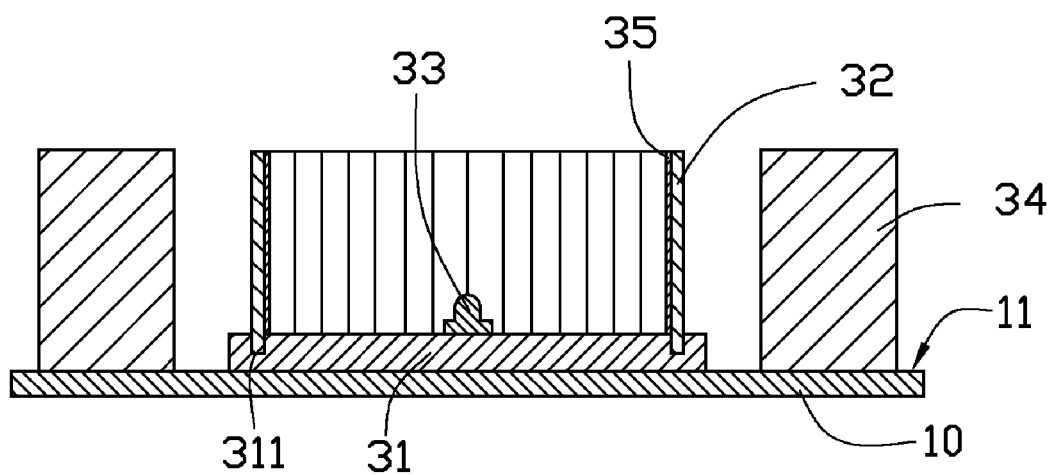
FIG. 4 is a cross sectional view of the rotation sensor taken along line IV-IV of FIG. 3.

Further referring to FIGS. 3 and 4, the rotation sensor 30 includes a supporting plate 31, a cylindric carrier 32, an electron emitting device 33, two magnets 34, a number of strip-shaped electrodes 35, and a detecting device 36. The rotation sensor 30 can be secured on the housing 10 of the portable electronic device 100, a circuit board (not shown) of the portable electronic device 100, etc. In the present embodiment, the rotation sensor 30 is secured on an inner surface 11 of the housing 10 of the portable electronic device 100.

The supporting plate 31 is attached to the inner surface 11 of the housing 10. The supporting plate 31 defines a circular slide groove 311 on a surface 311 thereof away from the inner surface 11. The supporting plate 31 can also be integrally formed with the housing 10. In the present embodiment, the supporting plate 31 is round.

The cylindric carrier 32 is disposed on the supporting plate 31 with one end thereof received in the circular slide groove 311. The cylindric carrier 32 is rotatable along the circular slide groove 311.

The electron emitting device 33 is disposed on the surface 311 of the supporting plate 31. The electron emitting device 33 is disposed on the center axis of the cylindric carrier 32, and emits electrons along the center axis of the cylindric carrier 32.

The two magnets 34 is configured for providing a magnetic field which direction is substantially parallel to the supporting plate 31. The magnetic field can change the moving direction of the electrons emitted by the electron emitting device 33, and the electrons will fall onto the inner surface of the cylindric carrier 32 finally. In the present embodiment, the two magnets 34 are secured on the inner surface 11 of the housing 10.

The strip-shaped electrodes 35 are formed on the inner surface of the cylindric carrier 32. The strip-shaped electrodes 35 are arranged parallel to the center axis of the cylindric carrier 32.

In the present embodiment, when the portable electronic device 100 is rotated along the center axis of the cylindric carrier 32, the supporting plate 31 and the magnets 34 are rotated together with the portable electronic device 100, while, the cylindric carrier 32 will hold still, as a result, the falling position of the electrons emitted by the electron emitting device 33 changes. The detecting device 36 is electrically connected to the strip-shaped electrodes 35. The detecting device 36 is configured for detecting the falling position of the electrons emitted by the electron emitting device 33 and generating a signal representing the parameters of the rotation of the portable electronic device 100 according to the change of the falling position of the electrons. The parameters of the rotation of the portable electronic device 100 includes the rotation direction and/or the rotation angle of the portable electronic device 100. The detecting device 36 can be secured on the cylindric carrier 32.

The processor 40 is electrically connected to the detecting device 36 and receives the signal generated by the detecting device 36. The processor 40 can generate an operating signal for operating the portable electronic device 100 according to the parameters of the rotation of the portable electronic device 100. In the present embodiment, a number of operating signals are preset in the processor 40 corresponding to the different kinds of rotation of the portable electronic device 100 with different parameters.

Figure 5:
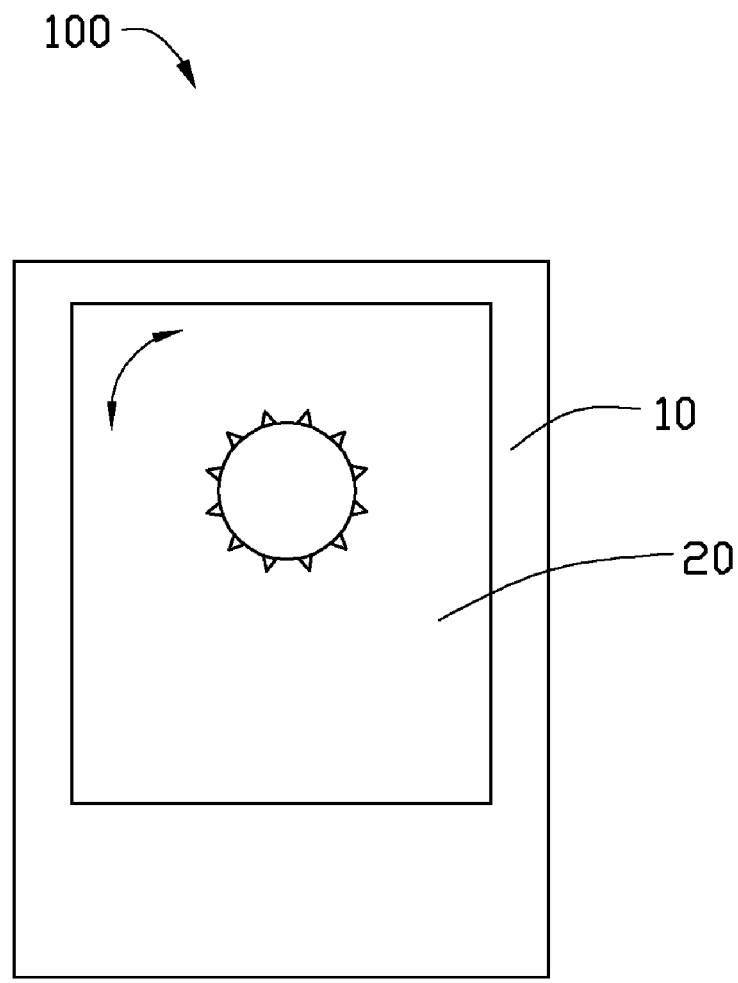
FIG. 5 is schematic views of the portable electronic device of FIG. 1 indicating a working state.

Referring to FIG. 5, in a picture view mode of the portable electronic device 100 according to the present embodiment, when the portable electronic device 100 is rotated clockwise, the processor 40 will generate an operating signal to operate the portable electronic device 100 to display a next picture. When the portable electronic device 100 is rotated anti-clockwise, the processor 40 will generate an operating signal to operate the portable electronic device 100 to display a previous picture. So, the portable electronic device 100 can display a next picture or a previous picture according to rotation of the portable electronic device 100, thereby reducing the number of buttons needed for operating the portable electronic device 100.

To aid a user operating the portable electronic device 100, the screen 20 of the portable electronic device 100 can display words or icons representing the operating signal corresponding to each kind of the rotation of the rotation of the portable electronic device 100. In the present embodiment, a same kind of rotation can activate different operating signals depending on current working mode of the portable electronic device 100.

In order to prevent the processor 40 from generating an operating signal according to a random minor rotation of the portable electronic device 100, a preset value of minimum rotation angle of the rotation of the portable electronic device 100 can be programmed into the processor 40. Thus, when a random minor rotation of the portable electronic device 100 happens, the processor 40 would not generate a corresponding operating signal.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. A portable electronic device comprising:
   a housing;
   a rotation sensor received in the housing, the rotation sensor comprising:
      a supporting plate fixed to the housing;
      a cylindric carrier disposed on the supporting plate and rotatable relative to the supporting plate;
      an electron emitting device disposed on the supporting plate and located on the center axis of the cylindric carrier for emitting electrons along the center axis of the cylindric carrier;
      at least one magnet for providing a magnetic field substantially parallel to the supporting plate and fixed relative to the housing;
      a plurality of strip-shaped electrodes formed on the inner surface of the cylindric carrier for sensing the falling position of the electrons emitted by the electron emitting device; and
      a detecting device for detecting the falling position of the electrons and generating a signal representing the parameters of the rotation of the portable electronic device according to the change of the falling position of the electrons; and
   a processor electrically connected to the detecting device, the processor receiving the signal generated by the detecting device and generating an operating signal for operating the portable electronic device according to the parameters of the rotation of the portable electronic device.

2. The portable electronic device of claim 1, wherein the supporting plate is attached to an inner surface of the housing.

3. The portable electronic device of claim 1, wherein the supporting plate defines a circular slide groove, and the cylindric carrier has one end received in the circular slide groove and rotatable along the circular slide groove.

4. The portable electronic device of claim 1, wherein the supporting plate is integrally formed with the housing.

5. The portable electronic device of claim 1, wherein the strip-shaped electrodes are arranged parallel to the center axis of the cylindric carrier.

6. The portable electronic device of claim 1, wherein the parameters of the rotation of the portable electronic device includes the rotation direction and/or the rotation angle of the portable electronic device.

7. The portable electronic device of claim 6, wherein a same kind of the rotation capable of activating different operating signals depending on current working mode of the portable electronic device.

8. The portable electronic device of claim 1, wherein a preset value of minimum rotation angle of the rotation of the portable electronic device is programmed into the processor.

9. A portable electronic device comprising:
   a rotation sensor for detecting rotation of the portable electronic device and generating a signal representing the parameters of the rotation of the portable electronic device, the rotation sensor comprising:
      a supporting plate fixed to the housing;
      a cylindric carrier disposed on the supporting plate and rotatable relative to the supporting plate;
      an electron emitting device disposed on the supporting plate and located on the center axis of the cylindric carrier for emitting electrons along the center axis of the cylindric carrier;
      at least one magnet for providing a magnetic field substantially parallel to the supporting plate and fixed relative to the housing;
      a plurality of strip-shaped electrodes formed on the inner surface of the cylindric carrier for sensing the falling position of the electrons emitted by the electron emitting device; and
      a detecting device for detecting the falling position of the electrons and generating a signal representing the parameters of the rotation of the portable electronic device according to the change of the falling position of the electrons; and
   a processor electrically connected to the rotation sensor, the processor receiving the signal generated by the rotation sensor and generating an operating signal for operating the portable electronic device according to the parameters of the rotation of the portable electronic device.

10. The portable electronic device of claim 9, wherein the supporting plate is attached to an inner surface of the housing.

11. The portable electronic device of claim 9, wherein the supporting plate defines a circular slide groove, and the cylindric has one end received in the circular slide groove and rotatable along the circular slide groove.

12. The portable electronic device of claim 9, wherein the supporting plate is integrally formed with the housing.

13. The portable electronic device of claim 9, wherein the strip-shaped electrodes are arranged parallel to the center axis of the cylindric carrier.

14. The portable electronic device of claim 9, wherein the parameters of the rotation of the portable electronic device includes the rotation direction and/or the rotation angle of the portable electronic device.

15. The portable electronic device of claim 14, wherein a same kind of the rotation capable of activating different operating signals depending on current working mode of the portable electronic device.

16. The portable electronic device of claim 9, wherein a preset value of minimum rotation angle of the rotation of the portable electronic device is programmed into the processor.

* * * * *